July 23, 1940.     D. B. BAKER ET AL     2,209,046
TRANSMISSION
Filed Sept. 21, 1936     2 Sheets-Sheet 2

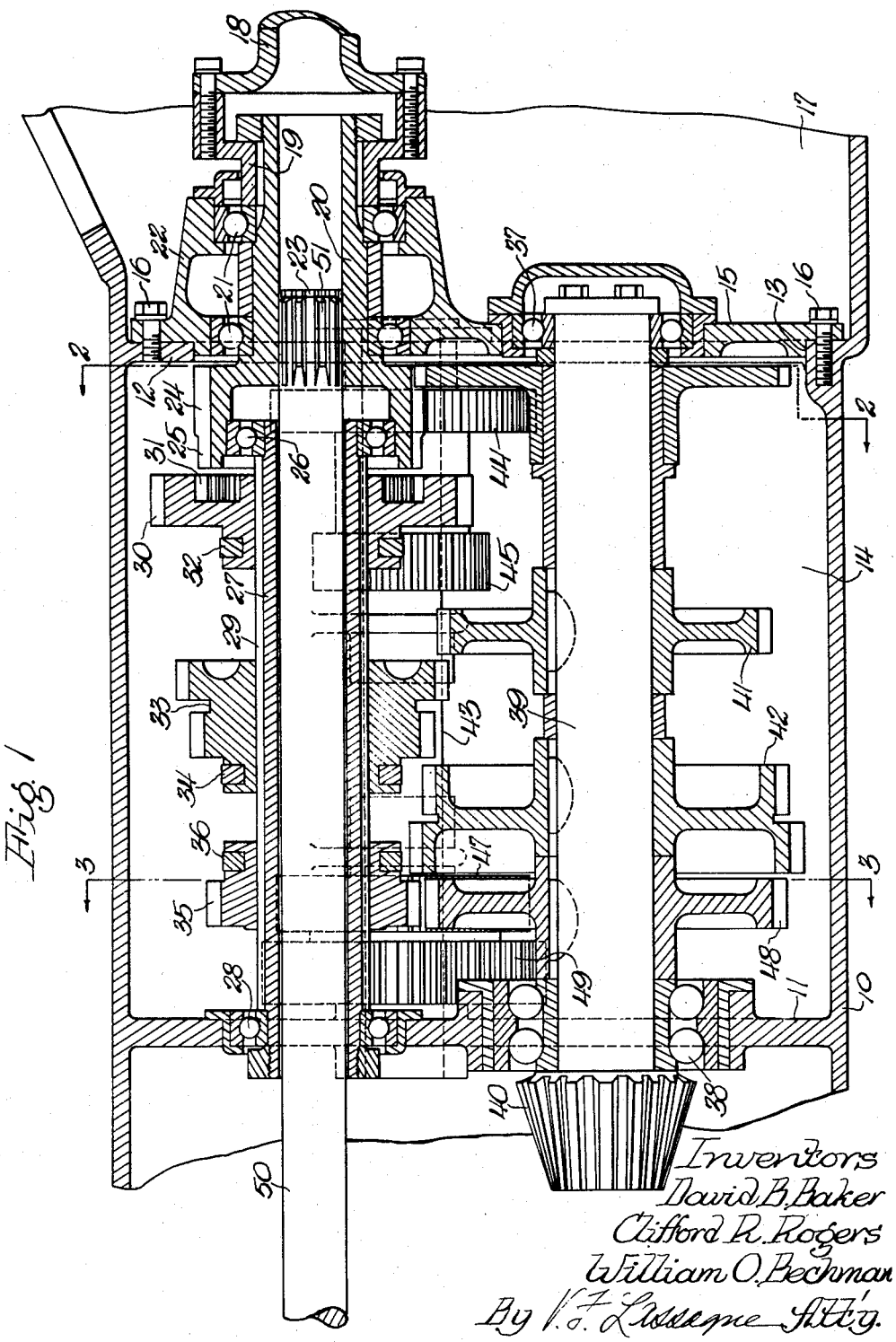

Inventors
David B. Baker
Clifford R. Rogers
William O. Bechman
By V. F. Lassague
Atty.

Patented July 23, 1940

2,209,046

UNITED STATES PATENT OFFICE 2,209,046

TRANSMISSION

David B. Baker, Riverside, Clifford R. Rogers, Oak Park, and William O. Bechman, Chicago, Ill., assignors to International Harvester Company, a corporation of New Jersey Application September 21, 1936, Serial No. 101,706

5 Claims. (Cl. 74—326)

This invention relates to a transmission or change speed gear set usable wherever in automotive installations it is desired to vary speeds between an engine power source, and a final drive mechanism.

More particularly, the invention relates to such a transmission for use in tractors, wherein it is desired to provide a wide range of speeds for varying the speed of travel of the tractor and wherein it is also desirable to incorporate a power jack or power take-off shaft for use in driving attached implements, and the like, from the engine of the tractor.

The main object of the invention is to provide an improved change speed gear transmission mechanism.

Another object of the invention is to provide a change speed gear transmission in which the main shaft thereof may be driven at two speeds so as to provide a double range of speeds for the change speed gears.

Another object of the invention is to provide in such a dual range change speed gear mechanism an improved form of power jack or power take-off shaft which turns at engine speed.

Still another object is to provide a very compact arrangement of such a change speed gear set in which only three shafts are used, one shaft serving as a mount for both the reverse gear and the gear which effects the second range of movement for the change speed gears.

Still another object of the invention is to provide a change speed gear transmission which incorporates a removable plate structure for mounting the three shafts thereon to facilitate assembly and disassembly of the shafts and gears in the body of the tractor, or the like.

Other important objects of the invention will become apparent to those versed in this art as the disclosure is more fully made. In the accompanying sheets of drawings is shown one embodiment which the invention may assume in practice. In these drawings:

Figure 1 is a longitudinal, sectional view through so much of the body of a tractor as is necessary to illustrate the change speed gear transmission and the improved power take-off shaft;

Figure 3:
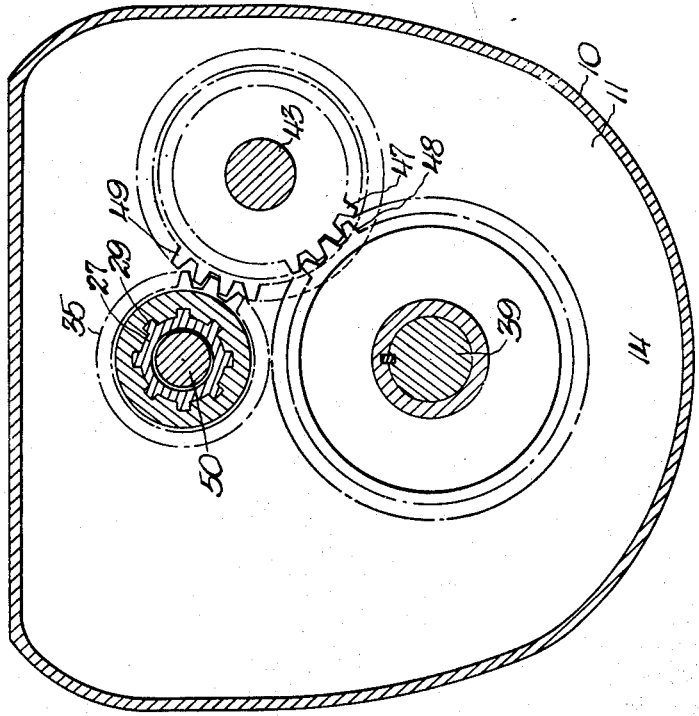
Figure 2:
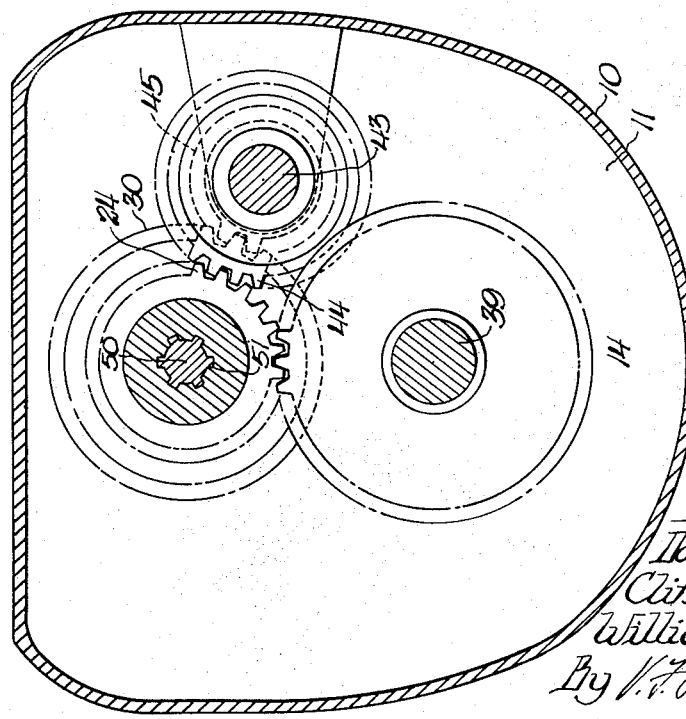
Figure 2 is a transverse, sectional view through the transmission taken along the line 2—2 of Figure 1 looking in the direction of the arrows; and, Figure 3 is a similar cross sectional view taken along the line 3—3 of Figure 1 looking in the direction of the arrows.

In looking at these drawings, it is to be understood that all views depict the transmission in neutral position with no driving connections established.

For the sake of illustration, the body of a tractor has been illustrated at 10, the same including a rear, integral, vertical wall 11 and a front flange 12 providing a large front opening 13, the space 14 thus provided constituting the change speed gear or transmission compartment. The front end of this compartment, and particularly the opening 13 therein, is closed by a vertical plate 15 removably connected in the body of the tractor 10 to the flange 12 by means of bolts 16. Forwardly of the compartment 14 and said plate 15 is the usual dry clutch compartment 17 wherein is located the usual master or engine clutch (not shown) for connecting and disconnecting to the flywheel of an engine, also not shown, a coupler or engine driven shaft 18.

This shaft 18 is hollow, or tubular and includes an internally splined hub 19 which is splined to a short coupler extension shaft 20 carried in bearings 21 and a carrier bracket 22 comprising an integral extension of the plate 15. It can thus be seen that the coupler shaft extension 20 which is also hollow or tubular is journaled in the upper portion of the front wall 15 of the transmission compartment 14, and that when the coupler shaft 18 is being turned with the engine clutch engaged to the flywheel, the shaft 20 turns therewith at engine speed. This coupler shaft 20 includes, at its rear end, an internal spline 23, said shaft further at its rear end being enlarged to provide a wide gear 24 and a clutch dog rim 25, said structure 24—25 carrying an internal bearing 26 for journaling the front end of a long quill or sleeve shaft 27.

This quill 27 is journaled at its rear end in a bearing 28 carried in the wall 11. This quill 27 constitutes the main power shaft of the change speed gear transmission. The quill 27 is externally splined, as at 29, and at its front end it carries a disconnectable driving means in the form of a shiftably mounted spur gear 30 including an internal clutch dog recess 31 adapted, when the gear 30 is shifted to the right, as seen in Figure 1, to establish a driving connection through the clutch portions 25 and 31 so that the gear 30 will turn with the gear 24. A fork 32 is provided for shifting the gear 30 on the quill 27. Clutching the gears 30 and 24 together establishes a direct drive to rotate the sleeve 27 at engine speed. At a mid-portion thereof the shaft 27 carries a double gear 33 also slidable on the spline 29 by means of a fork 34, providing second and third speeds of rotation from the quill shaft 27. Rearwardly of the double gear 33 is a reverse gear 35 shiftable by means of a fork 36. In one position gear 35 is a reverse gear and in another position it establishes a first or low speed. It will thus be seen that primarily the transmission is of the type providing three speeds forward and one speed reverse.

Below the main power or quill shaft 27, the walls 15 and 11, respectively, carry bearings 37 and 38 for journaling a longitudinal power output shaft 39 carrying at its rear end rearwardly of the bearing 38 a final power output or bevel gear 40. This shaft 39 has keyed thereon a gear 41 adapted to mesh with one of the double gears 33 to establish one speed relationship. The shaft 39 also carries a double gear 42 keyed thereon so that one of said gears may be meshed with one of the double gears 33 when the latter is shifted to establish another speed, and first speed, or low is established when the gear 35 is shifted into engagement with the other of the double gear 42, as will be obvious.

So that the tractor may be driven at a relatively wide range of speeds, it is desirable that a second range of speeds be provided so that in effect there will be six forward speeds, and this is achieved by the structure now to be described.

The front and rear walls 15 and 11 also serve to carry fixedly therein a spindle shaft 43 which is longitudinally disposed and parallel with the shafts 27 and 39. This shaft 43 at its front end carries a spur gear 44 constantly in mesh with the gear 24. Always turning with the gear 44, by means of a connecting hub, is a gear 45. The gear unit 44—45 is loosely mounted on the shaft, being permitted to rotate with respect thereto, and is held against axial movement in any suitable manner. When the gear 30 is shifted to the left, as shown in Figure 1, to disengage the same from driving relationship with the coupler gear 24, the same can be moved into engagement with the gear 45 and the engine power is then delivered from the gear 24 to the gear 44, and, since the gear 45 turns with the latter and is now in mesh with the gear 30, it will drive the quill 27 at another speed different from that which was supplied thereto when the clutch 31—25 was engaged as heretofore described. As a consequence, with the quill 27 turning at another speed it is now possible by shifting the gears 33 and 35 into relationship with the gears 42 and 41 to establish a second range of three speeds.

A reverse gear arrangement is also provided so that the tractor may be moved in a reverse direction. This is accomplished by mounting at the rear end of the spindle shaft 43 a gear 47 which may be called a reverse idler gear. This gear 47 is loosely mounted on the shaft 43 for rotation with respect thereto and is always in mesh with a large spur reverse gear 48 keyed to the rear end of the shaft 39. Turning with the gear 47 loosely about the countershaft 43 by means of a unifying hub is a gear 49 which does nothing and receives no power from the power supplying shaft 27 when forward speeds are established, but when the gear 35 is shifted rearwardly to mesh the gear 49, then the gear 47 no longer is an idler for it transmits leverage to turn the gear 48 and shaft 39 in a reverse direction. By means of the dual range provision heretofore described, the quill 27 can be turned from the coupler shaft 20 at two speeds, and, as a result, it follows that there can also be established two speeds in reverse. The transmission, there-fore, is, in the present embodiment, of that type which enables six forward speeds and two reverse speeds.

In the operation of the tractor, it frequently becomes necessary to supply power from the engine for turning an auxiliary machine or implement attached to the draw-bar of the tractor and being drawn thereby, for the purpose of driving an operative mechanism incorporated in such attached implement. Accordingly, power take-off shafts are provided to take care of this additional function to be performed by the tractor. It is desirable that such power take-off shaft, when it is turning, always operate at engine speed, and, since in the present transmission the main power shaft quill 27 turns at two speeds, it cannot be utilized for delivering power to such power take-off shaft. Generally, from the standpoint of design, it is desirable that the arrangement be as compact and inexpensive as possible, and from this standpoint and from the fact that the quill 27 turns at two speeds during the operation of the tractor, a real problem is encountered in providing a power take-off shaft arrangement. This invention solves this problem by the provision of the novel power take-off shaft arrangement shown in Figure 1 and now to be described.

The power take-off simply comprises a solid shaft 50 having a splined front end 51 whereby said shaft, from the rear of the tractor body, may be inserted therethrough and into the open end of the quill 27 and all the way therethrough so that the forward end of the shaft 50 may be spline-coupled through the spline 23 on the inside of the coupler shaft 20, heretofore described. By this means, the power take-off or shaft 50 will always drive at engine speed when the engine clutch is engaged independently of the change speed transmission. This power take-off shaft arrangement is very desirable, for usually such power take-off shaft is sold to the purchaser of a tractor as extra equipment and in present known designs tractors have to incorporate parts adapting it for use with a power take-off shaft even when such shaft is not purchased with the tractor. By means of the present structure no such special arrangement is involved and the tractor can be sold with or without the power take-off, as desired, for it is a simple matter to purchase, as extra equipment, a solid shaft like the shaft 50 of this disclosure that can be quickly coupled to the coupler shaft 20 for use.

In summarizing the operation of the improved transmission, it can be seen that the engine driven shaft 20 turns with the engine when the engine clutch, not shown, is engaged. When the clutch 25—31 is engaged, a direct speed is established through the quill 27 and gear 35 to drive the adjacent one of the gears 42 when such driving relationship is established by shifting the gear 35. Other speeds, such as second and third in the first range of speed of the quill 27, can be established by shifting the double gears 33 respectively into engagement with one of the gears 42 and the gear 41. A reverse in this first range of movement can be established by coupling the gear 35 with the gear 49 which in turn turns gear 47 and reverse gear 48. Thus, three forward speeds and one reverse have been established.

A second range of three speeds forward and one reverse can be established by separating the clutch 25—31 and shifting the gear 30 into mesh with the gear 45 which derives rotation from the gear 44 likewise in mesh with the gear 24.

A power take-off is provided by the solid shaft 50 passed through the quill 27 and coupled by the spline 51 and 23 to the coupler shaft 20 for driving the power take-off shaft 50 at engine speed and independently of the change speed gear transmission.

For convenience of assembly and disassembly, the plate 15 can be removed by taking out the bolts 16. This provision permits removal of the shafts and gearing, together with the plate, in a forwardly direction after the rear nuts holding the various shafts are uncoupled from in back of the wall 11.

Another convenient and compact arrangement of making it possible to use only three shafts in the transmission, is the location of the second range gear and the reverse gearing on the same shaft.

It is the intention to cover all such changes and modifications of the example of the invention herein disclosed which do not in material respects constitute departures from the spirit and scope of the invention as covered by the definitions thereof comprising the appended claims.

What is claimed is:

1. In a transmission, a housing carrying a main shaft provided with slidable gears, said housing carrying a parallel power output shaft provided with fixed gears cooperable with the slidable gears to drive the output shaft, a parallel spindle shaft carried in the housing, a power shaft adapted to be engine driven, said power shaft including clutch means to engage and drive the main shaft at one speed, a gear on the power shaft, gears on the spindle shaft rotatable together and cooperable with the gear on the power shaft and a gear on the main shaft to drive the main shaft at another speed, and a reverse gear on the spindle shaft rotatable independently of the aforesaid gears on said shaft and connectible between a gear on the main shaft and a gear on the output shaft to drive the output shaft in reverse.

2. A transmission comprising an engine shaft having an element at one end comprising an external gear and external clutch, a main shaft coaxial with the engine shaft and having a shiftable element comprising an external gear and an internal clutch element, said clutch elements adapted to be joined to cause the engine shaft to drive the main shaft at one speed, a parallel spindle shaft having thereon a unit comprising two gears one of which always meshes the gear on the engine shaft, the element on the main shaft being separable from the engine shaft whereby when the said element is shifted into mesh with the other gear of the unit on the spindle shaft the main shaft will be driven at another speed, a power output shaft having gears thereon, other gears slidably carried on the main shaft for driving the output shaft, and reverse gearing on the spindle shaft connectable between the main shaft and output shaft to drive the output shaft in reverse.

3. In a transmission, a main shaft and a parallel output shaft including change speed gearing, a power shaft adapted to be engine driven, disconnectable driving means between the power shaft and the main shaft, a parallel spindle shaft, a gear on the spindle shaft and driven by a portion of said driving means, a second gear on the spindle shaft rotatable with the first gear, said driving means being adapted to be connected to drive the main shaft at engine speed, said disconnectable means being separable to disengage the main and power shafts and movable to connect the main shaft with the second gear on the spindle shaft for driving the main shaft at a speed different from engine speed, a third gear on the spindle shaft rotatable independently of the first two gears, one of the gears of said change speed gearing being engageable with said third gear to drive the output shaft in a reverse direction.

4. A transmission comprising an engine driven shaft having at one end a conjointly rotatable gear and a clutch member, a main shaft coaxial with the engine shaft and having a conjointly rotatable and shiftable gear and a clutch member, said clutch members being adapted to be joined to cause the engine driven shaft to drive the main shaft at engine speed, a parallel spindle shaft having thereon two conjointly rotatable gears one of which always meshes with the gear on the engine shaft, the aforesaid clutch member on the main shaft being separable from the clutch member on the engine shaft whereby when the corresponding gear on the main shaft is shifted into mesh with the other gear on the spindle shaft the main shaft is driven at a speed different from engine speed, a power output shaft having gears thereon, other gears slidably carried on the main shaft for driving the output shaft, and reverse gearing on the spindle shaft connectable between the main shaft and output shaft to drive the output shaft in reverse.

5. In a transmission, a housing having a fixed end wall and a removably mounted end wall, the latter including an extension sleeve, an engine driven shaft journaled in the sleeve and projecting through the removable wall into the housing, a main transmission shaft journaled in the fixed wall and in a gear clutch element mounted on the projecting end of the engine shaft, slidable gears on the main shaft including a clutch gear to establish driving connection between the engine and main shafts, a parallel output shaft carried in the walls and having fixed gears thereon cooperable with the sliding gears to drive the output shaft, a parallel spindle shaft carried in the walls, a gear on the engine shaft, gearing on the spindle shaft adapted to be driven from said gear on the engine shaft whereby the main shaft may be driven from the engine shaft at another speed when the clutch is engaged with the spindle shaft gearing, and other gears including a gear on the spindle shaft adapted to connect the main and output shafts to drive the last named in reverse.

DAVID B. BAKER.
CLIFFORD R. ROGERS.
WILLIAM O. BECHMAN.

CERTIFICATE OF CORRECTION.

Patent No. 2,209,046.                                           July 23, 1940.

DAVID B. BAKER, ET AL.

It is hereby certified that error appears in the printed specification of the above numbered patent requiring correction as follows: Page 3, second column, lines 7 and 8, claim 3, for the words "said disconnectable means being separable" read --said means being disconnectable--; and that the said Letters Patent should be read with this correction therein that the same may conform to the record of the case in the Patent Office.

Signed and sealed this 10th day of September, A. D. 1940.

(Seal)                                                                         Leslie Frazer,
Acting Commissioner of Patents.